United States Patent Office 3,544,321

Patented Dec. 1, 1970

3,544,321

STABILIZATION OF ORGANIC PHOTOSENSITIVE MATERIAL

Yoshikazu Yamada, Sierra Madre, and Lester F. M. Storm, Pasadena, Calif., assignors to Bell & Howell Company, Chicago, Ill., a corporation of Illinois No Drawing. Filed July 21, 1966, Ser. No. 566,731

Int. Cl. G03c *5/24*

U.S. Cl. 96—48 19 Claims

ABSTRACT OF THE DISCLOSURE

A process for stabilizing a photographic image formed by image-wise exposure to actinic light of a photosensitive combination of an organic halogen and an aromatic nitrogen-atom containing compound, whereby the background and image areas are stabilized by the application of a compound containing a substituted phenoxy group.

This invention relates to photosensitive compositions, films or articles and to improved stabilization methods relating thereto. In particular, this invention relates to a method of stabilizing or fixing images obtained with organic photosensitive compositions.

In general, it is old and well known in the photographic arts to provide photographic systems involving two or more organic materials which react under the influence of actinic light to produce a color. As early as 1921, Murray C. Beebe and his coworkers described numerous organic photographic systems (e.g., U.S. Pats. Nos. 1,574,357; 1,574,358; 1,574,359; 1,575,143; 1,583,519; 1,587,269; 1,587,270; 1,587,271; 1,587,272; 1,587,273; 1,587,274; 1,604,674; 1,618,505; 1,655,127; 1,658,510; and 1,820,593). Generally, these systems relate to the use of various halogen compounds (e.g., iodoform and others) in combination with a second ingredient, in which Beebe and subsequent workers have theorized that light effects the release of a radical from the halogen compound which carries out a color-forming reaction with the second compound. Subsequent workers such as Eugene Wainer (e.g., U.S. Pats. Nos. 3,042,515; 3,042,516; 3,042,517; 3,042,518; 3,042,519; 3,046,125; and 3,056,673) and Robert Sprague (U.S. Pat. No. 3,082,086), as well as a number of other workers since the time of Beebe, have continued the development of various photographic systems involving a photo-energized reaction of a combination of a halogen-containing compound and one or more other compounds. Other recent disclosures include British Pat. No. 917,919 and Belgian Pat. No. 596,094.

More recently, it has been discovered that incorporation of certain of the above combinations as dispersions in a continuous phase, e.g., gelatin, in which such combinations are substantially insoluble, results in a photographic composition of superior speed, sensitivity and other properties. This discovery has been described in an application of Yoshikazu Yamada and Thomas H. Garland, Ser. No. 481,759, filed Aug. 23, 1965, entitled "Production and Use of Photosensitive Compositions and Films" in that application, it is explained that selection of an aromatic N-containing compound as there described merely for its ability to form some sort of color with a halogen containing compound under the influence of actinic light is a practical minimum for purposes of demonstrating the invention.

A drawback of exposed films incorporating the above compositions is their tendency to darken upon prolonged exposure to light. It is an object of this invention to provide a method of stabilizing exposed photographic compositions which utilize the organic photosensitive combinations described above. It is a further object to stabilize compositions which comprise a dispersion of an organic halogen compound and a second ingredient. It is a particular object to provide a method for stabilizing such photographic compositions dispersed in a non-solubilizing continuous phase. It is a still further object to provide a method wherein a photographic image is effectively stabilized against darkening of background areas and can be used repeatedly as a master in diazo and other reproduction processes involving repetitious exposure to light of any wavelength. Other and further objects, features and advantages of this invention will become apparent from the following description thereof.

Thus, this invention relates to a process in which a photographic image is formed by image-wise exposure to actinic light of a photosensitive combination of at least two starting agents, one of which is an organic halogen compound; and the above objects and others are accomplished by providing an improvement whereby light-sensitive areas remaining after formation of the image are desensitized, which improvement comprises subjecting such areas to a desensitizing amount of a compound containing a substituted phenoxy group, i.e., a group having the formula:

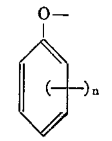

wherein *n* is an integer denoting the presence of from 1 to 5, preferably from 1 to 3, substituents. It is preferred that the compound have the formula:

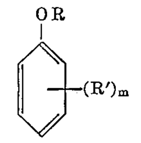

wherein *m* is an integer of from 1 to 3, R is a substituent selected from the group consisting of hydrogen, aliphatic groups, and aromatic groups and each R′ is independently selected from aliphatic groups, aromatic groups, primary amines, secondary amines, tertiary amines, hydroxy and groups having the formula:

$$-OR'',\ -O-R''-OH,\ -O-\overset{O}{\overset{\|}{C}}-R'',\ \overset{O}{\overset{\|}{C}}-OR''\ \text{and}\ -NH\overset{O}{\overset{\|}{C}}-R''$$

wherein each R″ is independently selected from aromatic and aliphatic groups. Examples of suitable substituents include: $-CH_3$, $-C_2H_5$, $-C_3H_7$, $-C_4H_9$, $-C_5H_{11}$, $-O-C(O)C_6H_5$, $-C_6H_5$, $-OH$, $-OCH_3$, $-OCH_2C_6H_5$, $-OCH_2CH_2OH$, $-NHC(O)CH_3$, $-NH_2$, $-C(O)OCH_3$, $-C(O)OC_6H_5$, and the like. In preferred embodiments, *m* is 1; such compounds are more readily available than others and generally more effective.

In a preferred embodiment, the compound has the formula:

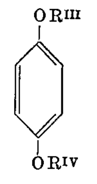

wherein $R^{III}$ and $R^{IV}$ are each independently selected from the group consisting of hydrogen, aliphatic groups and aromatic groups. These compounds are even more effective than others falling in the broader definition. Compounds in which $R^{III}$ is hydrogen or lower alkyl and $R^{IV}$ is lower alkyl are most particularly preferred as being generally most effective.

It is preferred that the aliphatic group be alkyl, cycloalkyl, or aralkyl and that the aromatic group be aryl or alkaryl. It is further preferred that alkyl be from 1 to about 12 carbon atoms, lower alkyl be from 1 to about 4 carbon atoms, cycloalkyl be from 5 to about 12 carbon atoms, aryl be from 6 to about 12 carbon atoms, aralkyl be from 7 to about 12 carbon atoms and alkaryl be from 7 to about 12 carbon atoms. Examples of useful compounds include: p-cresol, m-cresol, o-amino-p-cresol, di-o-amino-p-cresol, hydroquinone, p-aminophenol, di-o-aminophenol, 2,4,6-triaminophenol, p-methylanisole, m-ethylanisole, hydroquinone monomethyl ether, hydroquinone dimethyl ether, p-(benzyloxy)phenol, 1-tert-butyloxy-4-cyclopentyloxybenzene, 1-cyclopentyloxy-4-(5′-dodecyl)benzene, 3-isopropyl methyl salicylate, 1-benzyloxy-4-ethoxybenzene, 1-p-tert-amylbenzyloxy-3-sec-butylbenzene, 1,3-diamino-4-(3′-dodecoxy)benzene, 1-n-butoxy-4-(di-o-n-propyl-cyclohexoxy)-benzene, 1-ethyl-2-hydroxymethyl-5-(p-n-hexylphenoxy)benzene, 1-tert-octoxy-4-phenoxybenzene, 2,5-di-tert-butylhydroquinone, 1-n-propoxy-3-p-tert-octylphenoxybenzene, 1-amino-4-n-butyl-2-methoxy-5-p-methylphenylbenzene, p-dibenzyloxybenzene, hydroquinone di-beta hydroxyethyl ether, 4-hydroxyacetanilide, resorcinol monobenzoate, and the like.

The exposed film may be dipped into a solution, preferably an aqueous or miscible aqueous-organic solvent solution, of one or more of the above compounds or it may be sprayed or wiped with the solution. In this latter case, the solution may contain a thickener such as polyvinyl alcohol or carboxymethylcellulose.

In general, any amount of the desensitizing compound will diminish background darkening; a practical upper limit is about 15 weight percent of the solution and generally about 0.1 weight percent will noticeably prevent such darkening. A preferred range is from about 0.5 to about 10 weight percent. When dipping the exposed film into a bath containing the desensitizer, immersion for from a few seconds to about 5 minutes it generally satisfactory.

In a negative-working system the photosensitive film is subjected to actinic light in an image-wise projection (or exposure) wherein light is projected through the transparent or translucent areas of the original image to corresponding areas which are "light-struck" on the photosensitive film; and these light-struck areas ultimately appear as the darker colored areas either as a result of direct print-out by the projected actinic light or as a result of subsequent heating or other treatment. The areas that are not "light-struck" during the image-wise initial exposure retain their photosensitivity (as in the case of non-light-struck silver halide areas in silver photography). The instant invention provides a method of desensitizing these areas so that they will not later develop or otherwise impair the desired image on the film during storage or subsequent use.

When the photographic combination is dispersed in a non-solubilizing continuous phase the photosensitive non-light-struck combinations are particularly difficult to desensitize. In these films, the photosensitive material is "encapsulated," that is dispersed in clusters or globules, and desensitization involves penetration of the continuous phase to react with, neutralize or otherwise nullify photosensitivity of the non-light-struck material; and the penetrating desensitizer must not adversely effect the image. These problems have been effectively overcome by this invention.

A particularly important use involved in the practice of the instant invention is in the diazo reproduction system. In such a system, a so-called diazo master or intermediate is prepared, by a negative-working mode, and this diazo intermediate is employed in conjunction with actinic near ultraviolet light to produce a succession of prints on diazo paper. In this use the diazo intermediate is subjected to repeated exposures of actinic near ultraviolet light and the instant invention provides a method for desensitizing previously unexposed areas of the diazo intermediate such that they will not develop or darken during such repeated exposure.

In a preferred embodiment of the invention, the photosensitive combination comprises at least two starting agents, (a) and (b), one of which, (b), is an organic halogen compound. In other preferred embodiments, the other starting agent, (a), is a nitrogen atom-containing compound having certain structural characteristics. Thus, the process is particularly suitable when the nitrogen atom-containing compound used in the photosensitive combination has a nitrogen atom attached directly to at least one benzene ring, said benzene ring being free from carbon atom substitution in the position para to said nitrogen atom attachment. The process is also particularly suitable with nitrogen atom-containing compounds in which the nitrogen atom is a member of a heterocyclic ring. Still another type of nitrogen atom-containing compound with which the process is particularly useful is an N-vinyl compound.

It will be appreciated that there is substantial overlap between the above types of nitrogen-containing compounds and that the process is useful with photosensitive combinations that are formulated with nitrogen atom-containing compounds falling within one, two or even all three of the above terms; e.g., N-vinylcarbazole. It will also be appreciated that there is no generic term available in accepted chemical terminology that will effectively embrace all of the above types of nitrogen atom-containing compounds. It is merely important to note that photosensitive combinations containing a compound which has at least one of the above characteristics can be readily desensitized by the process of this invention. Photosensitive combinations containing compounds having more than one of the above characteristics lend themselves even better to the process. Examples of particularly effective nitrogen atom-containing compounds include N-vinylcarbazole, N-ethylcarbazole, indole and diphenylamine.

In another embodiment of this invention, the combinations desensitized by the process are dispersed in the form of discrete globules in a continuous water-penetrable phase in which the combination is substantially insoluble. Such dispersions are discussed in detail in the above-mentioned Yamada and Garland application. Generally, the solid-film-forming component used to achieve a continuous phase may be any of a number of generally photographically inert materials, which are, in most cases, soluble in water or so finely dispersible therein in the concentrations of use that for practical purposes there is no distinction between solution and dispersion for these materials in the continuous phase. Such materials include the starch and starch derivatives, proteins (i.e., casein, zein, gelatin, thiolated gelatin, etc.), alginates, gums, and the like materials which are generally considered to be natural derivatives of natural film-forming materials, any one of which in its conventional "water-soluble" form is used in the practice of the instant invention. In addition, synthetic water-soluble film-formers may also be used to particular advantage in the practice of the invention and such materials include polyvinyl alcohol, commercially available water-soluble polyacrylics or acrylates (i.e., water-soluble polyacrylic acid salts having substantially the molecular weight and water compatibility of the polyvinyl alcohol), various commercially available amine or amine-aldehyde resins, etc. Also, a number of cellulose derivative film-formers may be used, and these include the various water-soluble cellulose ethers, carboxymethylcellulose, hydroxypropylmethylcellulose, etc. Essentially these materials are photo-insensitive and their principal function is that of forming the desired film which will retain the dispersed phase in discrete particle form. Of the above materials, gelatin, casein, polyvinyl alcohol, gum arabic, starch, alkali metal carboxymethylcellulose (e.g., sodium carboxymethylcellulose) and hydroxyethylcellulose are particularly useful in this invention.

The use of nitrogen-containing compounds, particularly N-vinyl compounds, as part of the photosensitive combination is also described in detail in the above-mentioned Yamada and Garland application, as well as in several of the above-cited patents. When an N-vinyl compound is used in a non-solubilizing continuous phase, a complication arises which is solved by the present invention. In the environment of such a continuous phase the combination of organic halogen and N-vinyl compound is capable of undergoing two separate and distinct reactions on exposure to actinic light. In one reaction, in a negative-working mode, a colored material is formed in light-struck areas. In another reaction, in a positive-working mode, "colorless" polymer is thought to be first formed and subsequent blanket exposure to "stronger" light, forming a color in the initially non-light-struck areas, yields a positive-working image. These two reactions are competitive, the kinetics of which say that one or the other will predominate depending on the wavelength-intensity-exposure of light, with the "colorless" polymer-forming reaction occurring with "weaker" light. The result is that in the negative-working mode in fringe areas of exposure, especially where the exposure is by projection or in contact exposure where the contact is not exact and uniform, some polymeric reaction takes place; not enough reaction to form a line of demarcation between the image and non-image areas, but enough to form a protective polymeric coating around globules of material that are still photosensitive and capable of forming colored material. This same effect is also found when reproducing tonal images in both the positive and negative working modes; those areas of the image which receive only a slight exposure to light tend to form polymeric coatings around globules of still photosensitive materials. Even in those areas which are not exposed to imaging light, if a heat-treatment is used to bring out the image, some polymer may form as a result of previous slight light exposure during preparation of the coating and handling of the coated paper. Thus, if extreme measures are not taken to exclude all traces of actinic light during preparation of the coated paper, exposure to such traces of light may be sufficient, on subsequent heat-treatment, to form a polymeric coating around still photosensitive material. These fringe, tonal and partially "exposed" areas are particularly difficult to desensitize as the polymeric coating is impenetrable by most desensitizing materials. The desensitizing material must be capable of some penetration into the thin polymeric encapsulating coating without adversely reacting with the colored portions of the image. Most materials that can effectively penetrate the polymeric phase react with the uncoated colored portion and discolor or bleach the image. This invention provides a desensitizing material which effectively stabilizes the image obtained in both the negative and positive working modes without discoloration or bleaching.

In a particularly preferred method, the desensitizing compound is contained, in a desensitizing amount, as above, in a solution comprising substantial amounts of (1) water and (2) an organic solvent having significant miscibility in water. Such a solution is particularly adapted to enable the desensitizer to penetrate both the water-penetrable continuous phase and above-described polymeric encapsulating coating.

In this embodiment the choice of solvent depends on the particular desensitizer used and is preferably one in which the desensitizer is significantly soluble and which is itself miscible to a significant extent in water. A particularly preferred organic solvent is acetone as the desensitizers are generally significantly soluble in a miscible water-acetone solution. The solubility of the various desensitizers in other common solvents are, for the most part, known or can readily be determined by simple methods known to the art. In those cases where a particular desensitizer and a particular solvent is desired, but the solubility of the desensitizer in that solvent is not sufficient for purposes of this invention, then a second or even third organic solvent can be added; e.g., most of the desensitizers would have sufficient solubility in a mixture of acetone, ethanol or benzene; or methanol, ether and octane. The solvent ratios can be adjusted to afford proper solubility of the desensitizer in the aqueous solutions. Solvents useful in this invention include ethanol, methanol, isopropanol, ether, acetone, benzene, octane, glycerol, m-dioxane, p-dioxane, chloroform, acetic acid, ethyl acetate, carbon tetrachloride, carbon disulfide, dimethylsulfoxide, mixtures thereof, and the like. Acetone, the dioxanes and methanol are particularly suitable solvents.

In general, from about 5 to about 90 volume percent of water is added to the organic solvent; in any case, the amount of water present should be insufficient to cause substantial precipitation of the desensitizer from the solution. It is preferred to use at least 10 volume percent water.

In another method the desensitizing compound is contained in the recording medium itself, that is, it is incorporated into the binder or continuous phase along with the photosensitive combination. This method is particularly applicable where the photosensitive combination is substantially insoluble in the continuous phase, such as the dispersions described above, and where the continuous phase is penetrable by solvent in which the desensitizer has significant solubility. The desensitizer can be "activated" by immersing the recording medium into such solvent for a time sufficient to penetrate the continuous phase, from about 30 seconds to about 5 minutes, whereupon the desensitizer is brought into intimate contact with the photosensitive material rendering it photo-insensitive. Suitable solvents include those enumerated above. Generally from about 0.1 to about 15 weight percent of desensitizer; based on the weight of the continuous phase, can be added.

Where the continuous phase is water penetrable, water can be supplied as above or by incorporation into the binder of a water-releasing agent which releases water on the application of heat. Suitable water-releasing agents include: sodium sulfate decahydrate (Glauber's salt, which loses 10 molecules of water at 100° C.); sodium tetraborate decahydrate (borax, which loses 8 molecules of water at 60° C.); potassium aluminum sulfate (kalinite, which loses 9 molecules of water at 64.5° C.); sodium orthophosphate monohydrogen, both dodecahydrate and heptahydrate (each of which loses 5 molecules of water at 35° C. and 48° C., respectively); lithium nitrate trihydrate (which loses 2.5 molecules of water at 29.9° C.); and the like. Other materials that can be used include sodium triphosphate, sodium metasilicate, sodium alginate, sugar, and the like. It is preferable to use a more unstable hydrate, even containing less available water rather than hydrate which loses more water but at a higher temperature, so as to avoid prolonged heating of the photographic medium. Generally, from about 0.5 to about 15 weight percent of water as water-releasing agent can be added, based on the weight of the continuous phase. In order to "activate" the desensitizer the recording medium containing the water-releasing agent can be heated to an appropriate temperature, by placing over a heated platen, or by exposure to infrared, or in any convenient manner, whereupon water is released which carries the desensitizer into intimate contact with the photosensitive material, rendering it photo-insensitive.

The desensitizer reacts with the photosensitive material to destroy its photosensitivity or by some means prevent the photo-reaction. It is, therefore, surprising that such compounds could be incorporated into the binder without seriously affecting the photosensitivity of the product, especially when they are incorporated at the dispersion stage of preparation. When the dispersion is obtained by violently agitating the photosensitive materials in the continuous phase, the desensitizer can be added after substantial dispersion. It is found that particularly good results are obtained if the photosensitive material or one of the components thereof is first dissolved in a solvent therefor, which may be only a small amount, and then dispersed in the continuous phase with consequent volatilization of solvent. In general, little agitation is needed when a solvent is so used. For example, when a combination of N-vinylcarbazole and carbon tetrabromide is used as the photosensitive material, the N-vinylcarbazole, the carbon tetrabromide, or both, can be dissolved in a small amount of acetone, added to a continuous phase of aqueous gelatin and stirred to form discrete globules of photosensitive material upon volatilization of acetone. The desensitizer can then be added. Products formed in such manner have substantially full photosensitivity until the desensitizer is "activated" as above. The preparation of dispersions by the foregoing methods is described in detail in the Yoshikazu Yamada and Thomas H. Garland application Ser. No. 481,759, referred to above. Further details and procedures for incorporating the desensitizer can be found in an application by Yoshikazu Yamada and Lester F. M. Storm, entitled "Photographic Compositions," filed concurrently herewith.

The processes of this invention are particularly suitable to desensitizing photosensitive combinations in which the organic halogen compound is selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto. Compounds of this preferred group are described in U.S. Pats. 3,042,515, 3,042,516 and 3,042,517 and the descriptions and disclosures of these patents are hereby incorporated by reference. Examples of suitable organic halogen compounds include bromotrichloromethane, bromoform, iodoform, 1,2,3,4-tetrabromobutane, tribromoacetic acid, 2,2,2-tribromoethanol, tetrachlorotetrahydronaphthalene, 1,1,1-tribromo-2-methyl-2-propanol, carbon tetrachloride, p-dichlorobenzene, 4-bromobiphenyl, 1-chloro-4-nitrobenzene, p-bromoacetanilide, 2,4-dichlorophenol, 1,2,3,4-tetrachlorobenzene, 1,2,3,5-tetrachlorobenzene, brominated polystyrene, n-chlorosuccinimide, n-bromosuccinimide, 2-chloroanthraquinone, tetrabromophenolphthalein, tetrabromo-o-cresol, and the like. Particularly effective compounds include carbon tetrabromide, tribromochloromethane, dibromodichloromethane, pentabromoethane, hexachloroethane and hexabromoethane. In general, bromides are preferred.

Organic halogen compounds that are most particularly suitable with this invention have the formula $$Br—C—(X)(X')(X'')_n(CY_3)_{1-n}$$

wherein X, X' and X'' are halogens, each Y is independently selected from the group consisting of halogen, hydrogen, hydroxyl, methyl and methylol and $n$ is selected from 0 and 1, such that when $n$ is 0, X and X' are Br. Such compounds are more readily obtainable than others and yield better results.

In general, the weight ratios of the nitrogen-containing and halogen compound starting agents, (a) and (b) respectively, may vary widely, from a minimum practical weight ratio of (a):(b) of about 1:5 to a maximum ratio of about 50:1. If the proportion of halogen compound used is greater than that specified in the foregoing range, it is ordinarily found that no practical advantage is obtained, and, in general, the weight ratio of (a):(b) used is not below about 1:2, except in special situations wherein losses of a halogen compound (e.g., carbon tetrabromide) are contemplated prior to the actual use. Also, if the amount of halogen compound used is less than the minimum just specified, the combination may be inadequately photosensitive. When a combination of two or more organic halogen compounds are used in the practice of the instant invention in a continuous water penetrable phase, it has been found that advantages are obtained often in the use of weight ratios of 5:1 to about 20:1.

With regard to the relative weights of the solid compounds (a) and (b) in the dispersed phase compared to the solids (2) in the continuous phase, it is found that the solids weight ratio of (1):(2) is preferably about 1:2, but may range from a maximum practical ratio of about 5:1 to a practical minimum ratio of about 1:50. The continuous phase may be 100% "solids" in the sense that the entire system solidifies without any loss of water, but generally the solids-to-liquid ratio in the continuous phase is within the range of about 1:1 to about 1:30.

Preferably, also the dispersed phase particles are in the range of about 0.1 to about 20 microns, but the preferred range is about 0.3 to 10 microns, with an average particle size preferably of about 3 to 4 microns.

Further descriptions and examples of nitrogen atom-containing compounds, organic halogen compounds, dispersing mediums and other facets of compositions that can be desensitized by our process are given in the Yamada and Garland application referred to above, the disclosure of which is hereby incorporated by reference.

In a still further embodiment of this invention, light-sensitive areas remaining on the film after formation of the image are desensitized by subjecting the areas, by any of the above described methods to a desensitizing amount of a combination comprising:

(a) a compound of Formula I, above; and
(b) a compound selected from
  (1) a compound having the formula $$M_{3-v-w}(H)_wS_{1+x}O_{3+2x}$$

wherein $x$ is selected from 0 and 1, M is a cation selected from ammonium, alkali metals and alkaline earth metals, $v$ is the valence of the selected cation and $w$ is 0 when $v$ is 2 and is selected from 0 and 1 when $v$ is 1; and
  (2) a carbonyl-bisulfite complex, particularly of alkali metal bisulfite and ammonium bisulfite.

The combination of compound (a) with either compound (b)(1) or (b)(2) yields results which are generally superior to results obtained by the use of either of the compounds singly.

Referring to compound (b)(1), above, the cation chosen should be such that the compound is soluble in any particular solution used, e.g., acetone, water, etc. Examples of suitable compounds of the given formula include ammonium sulfite, lithium sulfite, sodium sulfite, potassium sulfite, magnesium sulfite, potassium metabisulfite, sodium metabisulfite, ammonium bisulfite, potassium bisulfite and sodium bisulfite. Further descriptions and examples of compound (b)(1) are given in an application by Yoshikazu Yamada and Thomas H. Garland, entitled "Photographic Method," filed concurrently herewith.

Referring to compound (b)(2), above, carbonyl compounds that can be used to form such complexes include the aliphatic methyl ketones, cycloaliphatic ketones and aliphatic, cycloaliphatic and aralkyl aldehydes. In structural terms, the carbonyl compounds generally have the formula:

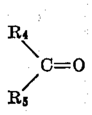

wherein $R_4$ is selected from hydrogen, methyl and methylene, $R_5$ is an aliphatic or aralkyl group when $R_4$ is hydrogen, is an aliphatic group when $R_4$ is methyl and, together with $R_4$, forms a cycloaliphatic group when $R_4$ is methylene. In general, "aliphatic" refers to alkyl and olefinic groups having from 1 to about 8 carbon atoms, "aralkyl" refers to benzene substituted alkyl groups having from 7 to about 12 carbon atoms and "cycloaliphatic" from about 5 to about 12 carbon atoms. Ketones are generally preferred.

Examples of suitable complexes include acetaldehyde-sodium bisulfite, acetone-cesium bisulfite, acetone-ammonium bisulfite, methyl ethyl ketone-rubidium bisulfite, methyl propyl-ketone sodium bisulfite, isobutyl ketone-potassium bisulfite, benzaldehyde-sodium bisulfite, o-methylbenzaldehyde-potassium bisulfite, cyclohexanone-lithium bisulfite, 4-ethylcyclohexanone-sodium bisulfite, and the like. Carbonyl complexes of alkali metal bisulfites are preferred, such as those of sodium and potassium. Acetone, 2-octanone, methyl ethyl ketone and cyclohexanone are preferred carbonyl compounds as they are generally more effective than other members of the above classes. The acetone bisulfites are most particularly effective. Further descriptions and examples of compounds (b) (2) are given in an application by Peter Bruck, entitled "Photographic Method," filed concurrently herewith.

Any relative amounts of compounds (a):(b) can be used, with superior results being obtained when the combination comprises from 1 to about 99 weight percent, preferably 10 to about 90 weight percent, of compound (a) and the remainder compound (b). Generally, a larger relative amount of compound (b) to compound (a) yields better results.

The following examples illustrate the various embodiments of this invention.

EXAMPLE 1

The following formulation was prepared and coated on vellum sheets, 3 mil wet thickness:

Aqueous gelatin, 20%—50 ml.
N-vinylcarbazole—2.5 g.
Carbon tetrabromide—0.75 g.
Ethyl acetate—1.5 ml.
Aerosol OT—8 drops
5% chrome alum—5 drops The N-vinylcarbazole and carbon tetrabromide were dissolved in the ethyl acetate which was then added to the aqeuous gelatin along with the other ingredients, whereupon the mixture was agitated until a uniform dispersion was achieved. A 2-second contact exposure, through a transparency, was made with a 275 watt G.E. sunlamp at 6.5 inches, followed by heat development. The result was a negative print on paper, the tone being reversed such that the light-struck areas were dark and the non-light-struck areas were light. The print was cut into test sections which were immersed for 5 minutes as follows:

Section 1—water as a control
Section 2—in a 1 weight percent aqueous solution of hydroquinone monomethyl ether The sections were handled in the dark. When dry, they were tacked onto the same piece of board and exposed to light from a fluorescent desk lamp at 12 inches. After 16 hours, section 1 (control) showed browning in all areas; section 2 (hydroquinone monomethyl ether) showed only slight browning.

EXAMPLE 2

The following formulation was prepared by the method of Example 1 and coated on vellum, 3 mil wet thickness:

Aqueous gelatin, 20%—50 ml.
N-vinylcarbazole—2.5 g.
Carbon tetrabromide—0.75 g.
Ethyl acetate—1.5 ml.
Aerosol OT—8 drops
Formalin—1 drop A coated sheet was exposed and processed to give a negative image according to the procedure given in Example 1. The print was cut into test sections which were immersed for 5 minutes in an aqueous solution containing 4 weight percent hydroquinone monomethyl ether and 2 weight percent sodium metabisulfite. Why dry, portions of the sections were masked and they were exposed in a fadeometer with the lamp set at 10 inches. After 2 hours, the background areas of the unmasked portions remained light.

EXAMPLE 3

A coated sheet was prepared and exposed using the photosensitive formulation and procedure of Example 2. The resultant print was cut into test sections which were immersed for 30 seconds and 1, 2 and 4 minutes in an aqueous solution containing 4 weight percent hydroquinone monomethyl ether and 1 weight percent sodium metabisulfite. When dry, portions of the sections were masked and they were exposed in a fadeometer with the lamp set at 24 inches. After 3 hours, the background areas of the unmasked portions were only slightly darkened.

EXAMPLE 4

A coated sheet was prepared and exposed using the photosensitive formulation and procedure of Example 2. The resultant print was cut into test sections which were immersed for 5 mintues into the following aqueous solutions (where percentages are by weight):

| Section No. | Percent hydroquinone Monomethyl ether | Percent sodium metabisulfite |
|---|---|---|
| 1 | 5 | ---------- |
| 2 | 0.025 | 1 |
| 3 | 1 | 0.25 |
| 4 | 4 | 1 |
| 5 | 1 | 4 |
| 6 | 1 | 1 |
| 7 | 1 | 0.1 |

When dry, portions of the sections were masked and they were exposed to light from a 275 watt G.E. sunlamp at 24 inches for 90 minutes. The background of sections 2, 3, 5, 6 and 7 remained light. The background of sections 1 and 4 darkened slightly. The sections were then additionally exposed to a fluorescent desk lamp at about 12 inches for about 16 hours. There was no further darkening of any of the sections.

EXAMPLE 5

A coated sheet was prepared and exposed using the photosensitive formulation and procedure of Example 2. A section of the resultant print was immersed for 5 minutes in an aqueous solution containing 4 weight percent hydroquinone monomethyl ether and I weight percent acetone sodium bisulfite. When dry, a portion of the section was masked and exposed to light from a fluorescent desk lamp at 12 inches. After 16 hours, the background areas remained light.

EXAMPLE 6

To test the shelf life of solutions used for desensitization the following aqueous solutions were prepared and stored for the times indicated:

| Solution No. | Percent hydroquinone monomethyl ether | Percent sodium metabi sulfite | Percent acetone sodium bisulfite | Age of solution (days) |
|---|---|---|---|---|
| 1 | 5 | ---------- | ---------- | 40 |
| 2 | 0.5 | 2 | ---------- | 41 |
| 3 | 2 | 0.5 | ---------- | 41 |
| 4 | 4 | ---------- | 1 | 41 |
| 5 | 1 | 4 | ---------- | 36 |
| 6 | 1 | 1 | ---------- | 36 |
| 7 | 1 | 0.1 | ---------- | 36 |

A coated sheet was prepared and exposed using the photosensitive formulation and procedure of Example 2. Test sections of the resultant print were immersed for 5 minutes in the above solutions. When dry, the sections were exposed to a fluorescent desk lamp at about 10 inches. After about 18 hours, the backgrounds of all the sections remained light. Of those sections immersed in solutions containing both sodium metabisulfite and hydroquinone monomethyl ether the lightest background appeared where there was a relatively greater amount of sodium metabisulfite.

EXAMPLE 7

A baryta paper sheet was coated with the photosensitive formulation of Example 2. A 2-second contact negative line copy exposure through a transparency was made with a 275 watt G.E. sunlamp at 7.5 inches, followed by heat development.

Clear miscible aqueous-organic solvent solutions were prepared from the following formulations:

| | |
|---|---|
| Solution 1: | |
| Acetone | 200 ml. |
| Water | 200 ml. |
| Hydroquinone dimethyl ether | 4 g. |
| Solution 2: | |
| Acetone | 200 ml. |
| Water | 200 ml. |
| Hydroquinone di-beta hydroxy ether | 4 g. |

The exposed baryta paper was cut into test sections which were immersed for 5 minutes, one in each of the above solutions. When dry, the sections were exposed to a fluorescent desk lamp at about 12 inches. After about 20 hours, the background of both sections remained light.

EXAMPLE 8

The procedure of Example 7 was repeated except that a continuous tone transparency was used to obtain a negative continuous tone image by contact exposure. After being immersed for 5 minutes in the solutions, dried and exposed to the fluorescent light for 16 hours, background areas were only slightly darkened.

EXAMPLE 9

Following the procedure of Example 2, N-vinylcarbazole and carbon tetrabromide can be dispersed in continuous phases of casein, polyvinyl alcohol, gum arabic, starch, sodium carboxymethylcellulose and hydroxyethylcellulose. The formulations can be coated on paper and exposed and heated as in Example 2 to form negative-mode images thereon. The paper can be cut into sections and separate sections of each formulation type can be dipped for 5 minutes into aqueous solutions containing 0.1 weight percent p-(benzyloxy)-phenol, 0.2 weight percent p-dibenzyloxybenzene, 0.4 weight percent 4-hydroxy-acetanilide, 0.6 weight percent resorcinol monobenzoate, and 0.5 weight percent 2,5-di-tert-amylhydroquinone, to desensitize the image on each section.

EXAMPLE 10

Following the procedure of Example 2, separate aqueous gelatin dispersions of N-vinylcarbazole and tribromochloromethane, pentabromoethane, hexachloroethane, bromotrichloromethane, p-dichlorobenzene and 2,2,2-tribromoethanol can be coated on paper, exposed and heated to form negative mode images thereon. The papers can be immersed in a 3% aqueous solution of hydroquinone monomethyl ether for 3 minutes to desensitize the image on each sheet.

EXAMPLE 11

Following the procedure of Example 2, separate aqueous gelatin dispersions of carbon tetrabromide and N-ethylcarbazole, indole, diphenylamine, benzothiazoline and benzoxyzoline can be coated on paper, exposed and heated to form negative mode images thereon. The papers can be immersed in 0.5 weight percent aqueous solution of hydroquinone di-beta-hydroxyethyl ether for 10 minutes to desensitize the image on each section.

EXAMPLE 12

Separate aqueous gelatin dispersions of carbon tetrabromide and N-vinylcarbazole can be prepared and coated on baryta paper following the procedure of Example 7. The coated sheets can be exposed to an 8× projected positive Kodachrome image (e.g., with a Bell & Howell slide projector with a 300 watt lamp) at 3 feet, for 10 seconds, left at room temperature for 15 minutes to enable a colorless polymer image to form, exposed for 1 second with a sunlamp at 7.5 inches and then developed for 1 hour at 140° C. to obtain positive mode photographs. The photographs can be immersed for 5 minutes in the following aqueous-organic solvent solutions containing 3 weight percent hydroquinone monomethyl ether: a 50:50 volume percent solution of methanol: water, a 30:70 volume percent solution of acetone:water, a 5s55s40 volume percent solution of benzene:ethanol:water, a 40:50:10 volume percent solution of methanol:ether:water, a 5:40:55 volume percent solution of p-dioxane:acetone:water and a 10:60:30 volume percent solution of m-dioxane:methanol:water, to desensitive the image on each sheet.

EXAMPLE 13

A formulation can be prepared following the procedure of Example 1, but which additionally contains 4 grams of hydroquinone monomethyl ether, added subsequent to dispersion of the N-vinylcarbazole and carbon tetrabromide. The formulation can be coated on paper and exposed and heated as in Example 1 to yield a negative mode image. By immersing the paper in water for about 1 minute, the background areas can be desensitized so as to retard darkening upon prolonged exposure to light.

EXAMPLE 14

A formulation can be prepared as in Example 13, but which additionally contains 4 grams of lithium nitrate trihydrate, sodium orthophosphate dodecahydrate, borax, kalinite, or Glauber's salt. The sheet can be exposed as in Example 13, but then heated for 5 minutes at 35° C., 48° C., 64° C., 70° C. or 100° C., respectively, to yield records with backgrounds that resist darkening.

With each of the above formulations, prior to heating, an overcoating of Scotch tape, or other flexible, transparent, water-impermeable material, can be applied to retain moisture and enhance desensitization.

It will be understood that modifications and variations may be effected without departing from the scope of the novel concepts of the present invention.

We claim:

1. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying a solution of a stabilizing amount of a compound having the formula

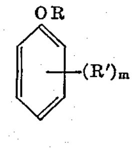

wherein $m$ is an integer of from 1 to 3, R is a substituent selected from the group consisting of hydrogen, aliphatic groups, and aromatic groups and each R′ is independently selected from aromatic groups, primary amines, secondary amines, tertiary amines, hydroxy, groups having the formula:

$$-OR'',\ -O-R''-OH,\ -O-\overset{O}{\overset{\|}{C}}-R'',\ \overset{O}{\overset{\|}{C}}-OR''\ \text{and}\ -NN\overset{O}{\overset{\|}{C}}-R''$$

wherein each R″ is independently selected from aromatic and aliphatic groups, and non-amine aliphatic groups.

2. The improvement of claim 1 in which said stabilizing amount comprises at least 0.1 weight percent of said solution.

3. The improvement of claim 1 wherein the organic halogen compound is selected from the group consisting of carbon tetrabromide, tribromochloromethane, dibromodichloromethane, tribromoacetic acid, pentabromoethane, hexachloroethane and hexabromoethane.

4. The improvement of claim 1 wherein the nitrogen atom-containing compound is an N-vinyl compound.

5. The improvement of claim 1 wherein the nitrogen atom-containing compound is selected from the group consisting of N-vinylcarbazole, N-ethylcarbazole, indole and diphenylamine.

6. The improvement of claim 5 wherein the binder is selected from the group consisting of gelatin, casein, polyvinyl alcohol, gum arabic, starch, alkali metal carboxymethylcellulose and hydroxyethylcellulose.

7. The improvement of claim 1 wherein said material additionally contains a compound selected from (1) a compound having the formula $$M_{3-v-w}(H)_wS_{1+x}O_{3+2x}$$

wherein $x$ is selected from 0 and 1, M is a cation selected from ammonium, alkali metals and alkaline earth metals, $v$ is the valence of the selected cation and $w$ is 0 when $v$ is 2 and is selected from 0 and 1 when $v$ is 1; and (2) a carbonyl-bisulfite complex.

8. The improvement of claim 7 wherein the second compound is an alkali metal metabisulfite.

9. The improvement of claim 7 wherein the second compound is an acetone-bisulfite.

10. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying a solution of a stabilizing amount of a compound having the formula

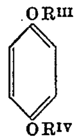

where $R^{III}$ and $R^{IV}$ are each independently selected from the group consisting of hydrogen, aliphatic groups and aromatic groups.

11. The improvement of claim 10 in which said stabilizing amount comprises at least 0.1 weight percent of said solution.

12. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying a solution of stabilizing amount of a compound having the formula

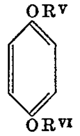

wherein $R^V$ is selected from the group consisting of hydrogen and lower alkyl and $R^{VI}$ is a lower alkyl.

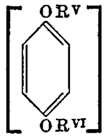

13. The improvement of claim 12 in which said stabilizing amount comprises from about 0.1 to about 15 weight percent of said solution.

14. A transparency suitable for use as an image mask for an actinic light source in a photographic reproduction process, which comprises a photographic image in a solid film forming hydrophilic binder on a translucent carrier formed by exposure to actinic light of a photosensitive combination in said binder of:

(a) an organic halogen compound selected from the group of compounds which produce free radicals or ions upon exposure to light of a suitable wave length and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, wherein image and background areas have been stabilized by applying thereto a solution of a stabilizing amount of a compound having the formula

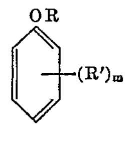

wherein $m$ is an integer of from 1 to 3, R is a substituent selected from the group consisting of hydrogen, aliphatic groups, and aromatic groups and each R′ is independently selected from aromatic groups, primary amines, secondary amines, tertiary amines, hydroxy, groups having the formula:

$$-OR'',\ -O-R''-OH,\ -O-\overset{O}{\overset{\|}{C}}-R'',\ \overset{O}{\overset{\|}{C}}-OR''\ \text{and}\ -NH\overset{O}{\overset{\|}{C}}-R''$$

wherein each R″ is independently selected from aromatic and aliphatic groups, and non-amine aliphatic groups.

15. The transparency of claim 14 in which said stabilizing amount comprises at least 0.1 weight percent of said solution.

16. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying an aqueous solution of a water-miscible organic solvent, said solution containing as stabilizer for the combination a stabilizing amount of

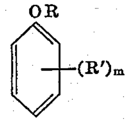

wherein *m* is an integer of from 1 to 3, R is a substituent selected from the group consisting of hydrogen, aliphatic groups, and aromatic groups and each R′ is independently selected from aromatic groups, primary amines, secondary amines, teritary amines, hydroxy, groups having the formula, $$-OR'',\ -O-R''-OH,\ -O-\overset{O}{\overset{\|}{C}}-R'',\ \overset{O}{\overset{\|}{C}}-OR''\ \text{and}\ -NH\overset{O}{\overset{\|}{C}}-R''$$

wherein each R″ is independently selected from aromatic and aliphatic groups, and non-amine aliphatic groups.

17. The improvement of claim 16 in which said stabilizing amount comprises at least 0.1 weight percent of said solution.

18. The improvement of claim 14 wherein said material additionally contains a compound selected from (1) a compound having the formula $$M_{3-v-w}(H)_wS_{1+x}O_{3+2x}$$

wherein *x* is selected from 0 and 1, M is a cation selected from ammonium, alkali metals and alkaline earth metals such that the compound is water soluble in desensitizing amount, *v* is the valence of the selected cation and *w* is 0 when *v* is 2 and is selected from 0 and 1 when *v* is 1; and (2) a carbonyl-bisulfite complex.

19. The improvement of claim 16 wherein said material additionally contains a compound selected from (1) a compound having the formula $$M_{3-v-w}(H)_wS_{1+x}O_{3+2x}$$

wherein *x* is selected from 0 and 1, M is a cation selected from ammonium, alkali metals and alkaline earth metals, *v* is the valence of the selected cation and *w* is 0 when *v* is 2 and is selected from 0 and 1 when *v* is 1; and (2) a carbonyl-bisulfite complex.

References Cited

UNITED STATES PATENTS

| | | | |
|---|---|---|---|
| 3,121,632 | 2/1964 | Sprague et al. | 96—90 X |
| 3,374,094 | 3/1968 | Weaver | 96—67 X |

NORMAN G. TORCHIN, Primary Examiner

R. E. FICHTER, Assistant Examiner

U.S. Cl. X.R.

96—88, 90

UNITED STATES PATENT OFFICE

CERTIFICATE OF CORRECTION

Patent No. 3,544,321 Dated December 1, 1970

Inventor(s) Yoshikazu Yamada et al.

It is certified that error appears in the above-identified patent and that said Letters Patent are hereby corrected as shown below:

Column 3, line 40, "it" should read -- is -- . Column 1 line 4, "Why" should read -- When --. Column 12, line 21, "desensitive" should read -- desensitize --. Column 13, line $-NNC(=O)-R''$ should read $-NHC(=O)-R''$ Column 14, lines 35 to 39, cancel the bracketed material.

Signed and sealed this 1st day of June 1971.

(SEAL)
Attest:

EDWARD M.FLETCHER,JR.
Attesting Officer

WILLIAM E. SCHUYLER,
Commissioner of Paten